(12) United States Patent
Kondo

(10) Patent No.: US 11,527,981 B2
(45) Date of Patent: Dec. 13, 2022

(54) HUMAN-POWERED VEHICLE CONTROL DEVICE, ELECTRONIC DEVICE, AND HUMAN-POWERED VEHICLE CONTROL SYSTEM

(71) Applicant: SHIMANO Inc., Sakai (JP)

(72) Inventor: Tomohiro Kondo, Sakai (JP)

(73) Assignee: Shimano Inc., Sakai (JP)

(*) Notice: Subject to any disclaimer, the term of this patent is extended or adjusted under 35 U.S.C. 154(b) by 666 days.

(21) Appl. No.: 16/505,578

(22) Filed: Jul. 8, 2019

(65) Prior Publication Data
US 2020/0014322 A1 Jan. 9, 2020

(30) Foreign Application Priority Data

| Jul. 9, 2018 | (JP) | JP2018-130244 |
| Jul. 9, 2018 | (JP) | JP2018-130245 |
| Jul. 9, 2018 | (JP) | JP2018-130246 |
| Dec. 18, 2018 | (JP) | JP2018-236764 |

(51) Int. Cl.
| H02P 23/00 | (2016.01) |
| B62M 6/45 | (2010.01) |
| H02P 21/00 | (2016.01) |
| B62K 23/00 | (2006.01) |
| G05B 13/04 | (2006.01) |

(52) U.S. Cl.
CPC .......... *H02P 23/0031* (2013.01); *B62K 23/00* (2013.01); *B62M 6/45* (2013.01); *H02P 21/0021* (2013.01); *G05B 13/04* (2013.01)

(58) Field of Classification Search
CPC .......... H02P 23/0031; H02P 21/0021

USPC .......... 318/3, 558; 180/206.2
See application file for complete search history.

(56) References Cited

U.S. PATENT DOCUMENTS 5,274,801 A * 12/1993 Gordon .......... G06N 5/04
706/50
6,047,230 A 4/2000 Spencer et al.
(Continued)

FOREIGN PATENT DOCUMENTS

| CN | 106896723 A | 6/2017 |
| DE | 102014007265 A1 | 11/2014 |

(Continued)

*Primary Examiner* — David Luo
(74) *Attorney, Agent, or Firm* — Alleman Hall Creasman & Tuttle LLP

(57) ABSTRACT

A human-powered vehicle control device includes an artificial intelligence processor, an operation device, and a communication device. The artificial intelligence processor is configured to generate second information for controlling an electric component of a human-powered vehicle in accordance with first information related to at least one of the human-powered vehicle, a rider of the human-powered vehicle, and an environment of the human-powered vehicle. The operation device operates the electric component. The communication device is configured to communicate with an external device. The artificial intelligence processor is configured to change a process for generating the second information in accordance with the first information and an operation of the operation device. The communication device is configured to transmit third information related to a process for generating the second information to the external device.

16 Claims, 7 Drawing Sheets

(56) References Cited

U.S. PATENT DOCUMENTS

| | | | |
|---|---|---|---|
| 6,682,087 B1* | 1/2004 | Takeda | B62K 23/00 |
| | | | 701/52 |
| 6,877,755 B2* | 4/2005 | Takamoto | B62M 25/04 |
| | | | 474/70 |
| 7,399,244 B2 | 7/2008 | Takebayashi et al. | |
| 7,522,033 B2* | 4/2009 | Takamoto | B62M 25/08 |
| | | | 340/432 |
| 7,760,078 B2 | 7/2010 | Miki et al. | |
| 7,902,967 B2 | 3/2011 | Takebayashi | |
| 8,655,561 B2 | 2/2014 | Kitamura | |
| 9,399,500 B1 | 7/2016 | Hashimoto et al. | |
| 9,975,603 B2 | 5/2018 | Bortolozzo et al. | |
| 10,696,351 B2 | 6/2020 | Suzuki et al. | |
| 2008/0114519 A1 | 5/2008 | DuFaux et al. | |
| 2008/0276493 A1 | 11/2008 | Dunias | |
| 2015/0197308 A1 | 7/2015 | Butora et al. | |
| 2016/0001782 A1 | 1/2016 | Fiedler | |
| 2016/0075177 A1 | 3/2016 | Biderman et al. | |
| 2016/0144928 A1 | 5/2016 | Chun | |
| 2017/0259879 A1 | 9/2017 | Southey et al. | |
| 2017/0282919 A1 | 10/2017 | Schieffelin | |
| 2018/0009508 A1 | 1/2018 | Suzuki et al. | |
| 2018/0072373 A1 | 3/2018 | Kishita et al. | |
| 2018/0197401 A1 | 7/2018 | Khaligh et al. | |
| 2018/0232982 A1 | 8/2018 | Hsu et al. | |
| 2019/0126913 A1 | 5/2019 | Kinuhata et al. | |
| 2019/0195341 A1 | 6/2019 | Baumgaertner et al. | |
| 2019/0202512 A1 | 7/2019 | Shen et al. | |
| 2019/0315431 A1 | 10/2019 | Vijaya Kumar et al. | |
| 2020/0010137 A1 | 1/2020 | Komemushi | |
| 2020/0014321 A1 | 1/2020 | Kondo | |
| 2020/0130771 A1 | 4/2020 | Jacobsz Rosier et al. | |
| 2020/0247498 A1 | 8/2020 | Yamamoto et al. | |
| 2020/0410375 A1 | 12/2020 | Seagraves et al. | |
| 2021/0031848 A1 | 2/2021 | Du | |
| 2021/0147024 A1 | 5/2021 | Carlier | |
| 2021/0323622 A1 | 10/2021 | Shen et al. | |
| 2022/0016984 A1 | 1/2022 | Huang et al. | |

FOREIGN PATENT DOCUMENTS

| | | |
|---|---|---|
| JP | 2002234479 A | 8/2002 |
| JP | 2008504857 A | 2/2008 |
| JP | 2012144061 A | 8/2012 |
| JP | 2012148580 A | 8/2012 |
| JP | 5960566 B2 | 8/2016 |
| JP | 2017522634 A | 8/2017 |
| WO | 2005058160 A1 | 6/2005 |
| WO | 2014029759 A1 | 2/2014 |
| WO | 2017093293 A1 | 6/2017 |
| WO | 2018059801 A1 | 4/2018 |

* cited by examiner

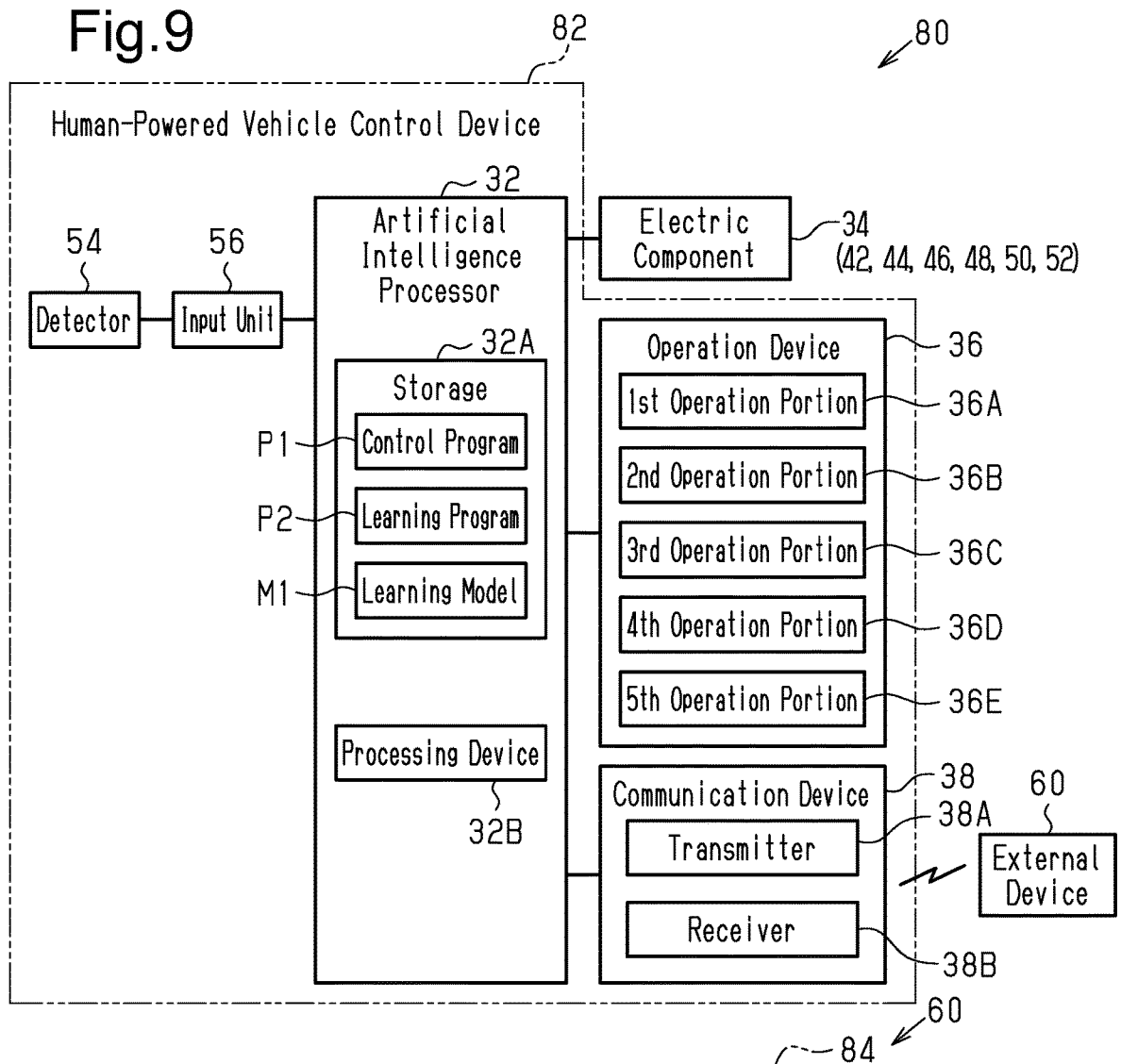
Fig.9
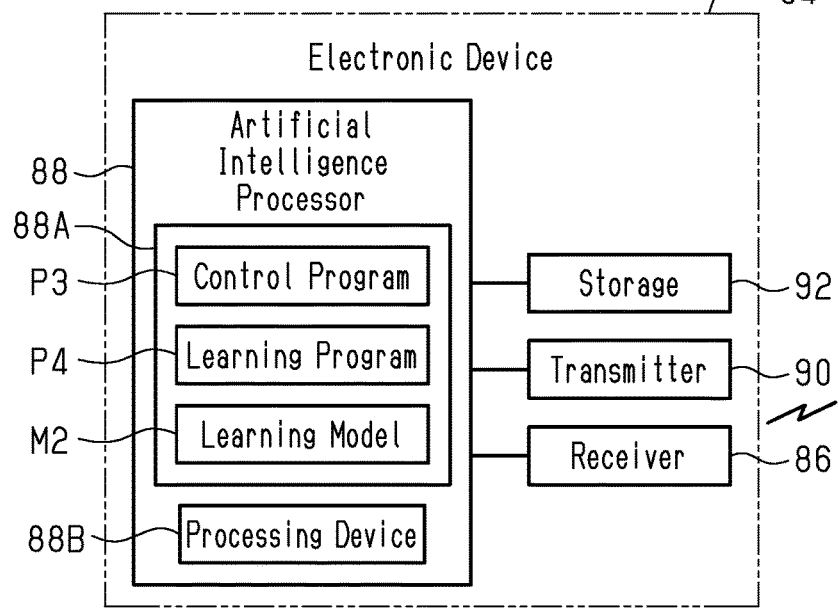

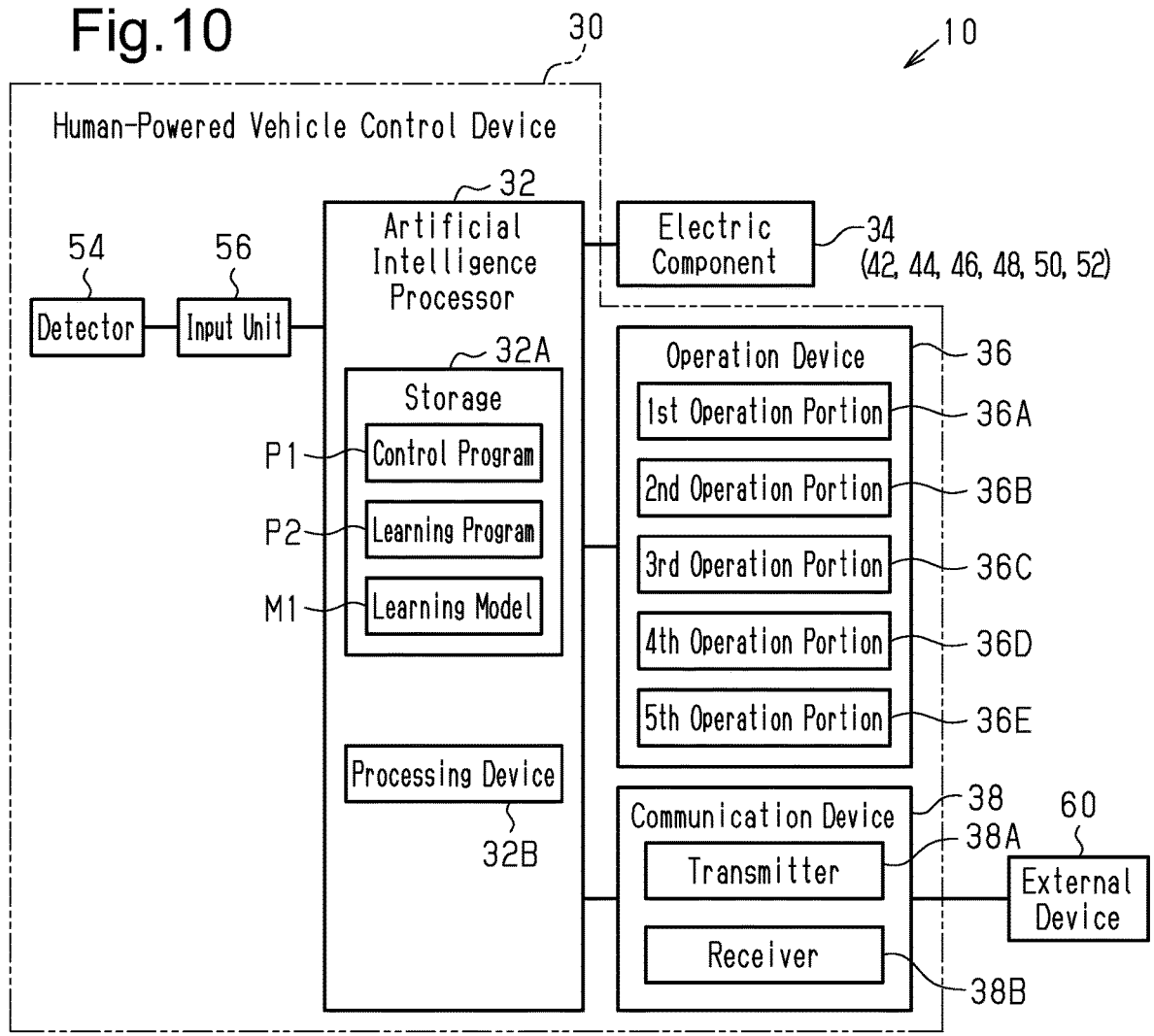

HUMAN-POWERED VEHICLE CONTROL DEVICE, ELECTRONIC DEVICE, AND HUMAN-POWERED VEHICLE CONTROL SYSTEM

BACKGROUND ART

The present disclosure relates to a human-powered vehicle control device, an electronic device, and a human-powered vehicle control system.

Patent document 1 discloses an example of a human-powered vehicle control device configured to execute various controls in accordance with an output of a detector provided in a human-powered vehicle.

Patent Document 1: Japanese Laid-Open Patent Publication No. 2012-144061

SUMMARY

Patent document 1 discloses human-powered vehicle control device that executes various controls in accordance with predetermined conditions. However, the preferable conditions and the preferable controls change depending on the user, the traveling environment, and the like.

One object of the present disclosure is to provide a human-powered vehicle control device, an electronic device, and a human-powered vehicle control system that improve usability.

A human-powered vehicle control device in accordance with a first aspect of the present disclosure comprises an artificial intelligence processor, an operation device, and a communication device. The artificial intelligence processor is configured to generate second information for controlling an electric component of a human-powered vehicle in accordance with first information related to at least one of the human-powered vehicle, a rider of the human-powered vehicle, and an environment of the human-powered vehicle. The operation device operates the electric component. The communication device is configured to communicate with an external device. The artificial intelligence processor configured to change a process for generating the second information in accordance with the first information and an operation of the operation device. The communication device configured to transmit third information related to a process for generating the second information to the external device.

In accordance with the human-powered vehicle control device of the first aspect, the third information is transmitted to the external device so that the third information is used outside the human-powered vehicle control device. This improves usability.

A human-powered vehicle control device in accordance with a second aspect of the present disclosure comprises an artificial intelligence processor and a communication device. The artificial intelligence processor configured to generate second information for controlling an electric component of a human-powered vehicle in accordance with first information related to at least one of the human-powered vehicle, a rider of the human-powered vehicle, and an environment of the human-powered vehicle. The communication device is configured to receive third information related to a process for generating the second information transmitted from an external device.

In accordance with the human-powered vehicle control device of the second aspect, the third information is received from the external device so that the third information generated outside the human-powered vehicle control device is used. This improves usability.

In accordance with a third aspect of the present disclosure, the human-powered vehicle control device according to the second aspect is configured so that the artificial intelligence processor is configured to change the second information in accordance with the third information.

In accordance with the human-powered vehicle control device of the third aspect, the electric component is controlled in a preferred manner because the second information is changed in accordance with the third information generated outside the human-powered vehicle control device.

In accordance with a fourth aspect of the present disclosure, the human-powered vehicle control device according to the third aspect is configured so that the artificial intelligence processor is configured to change the process for generating the second information in accordance with the third information.

In accordance with the human-powered vehicle control device of the fourth aspect, the electric component is controlled in a preferred manner because the process for generating the second information is changed in accordance with the third information generated outside the human-powered vehicle control device.

In accordance with a fifth aspect of the present disclosure, in the human-powered vehicle control device according to any one of the second to fourth aspects, the communication device is configured to receive the third information through wireless communication.

In accordance with the human-powered vehicle control device of the fifth aspect, the third information is received in a preferred manner through wireless communication.

In accordance with a sixth aspect of the present disclosure, in the human-powered vehicle control device according to any one of the second to fifth aspects, the communication device is configured to receive the third information through wired communication.

In accordance with the human-powered vehicle control device of the sixth aspect, the third information is received in a preferred manner through wired communication.

In accordance with a seventh aspect of the present disclosure, the human-powered vehicle control device according to any one of the first to sixth aspects further comprises storage for storing the third information.

In accordance with the human-powered vehicle control device of the seventh aspect, the third information is stored by the storage.

In accordance with an eighth aspect of the present disclosure, the human-powered vehicle control device according to any one of the first to seventh aspects is configured so that the external device includes at least one of a memory device, a mobile communication device, a personal computer, and a server connected to the Internet.

In accordance with the human-powered vehicle control device of the eighth aspect, the third information is transmitted or received with the memory device, the mobile communication device, the personal computer, and the server connected to the Internet.

In accordance with a ninth aspect of the present disclosure, the human-powered vehicle control device according to any one of the first to eighth aspects is configured so that the third information includes predetermined identification information of an individual.

In accordance with the human-powered vehicle control device of the ninth aspect, the third information corresponding to the rider can be used by referring to the predetermined identification information of an individual included in the third information.

In accordance with a tenth aspect of the present disclosure, the human-powered vehicle control device according to any one of the first to ninth aspects is configured so that the external device includes a key of a lock device for restricting at least one of traveling of the human-powered vehicle and operation of the electric component.

In accordance with the human-powered vehicle control device of the tenth aspect, transmission or reception of the third information is performed with the key of the lock device.

In accordance with an eleventh aspect of the present disclosure, the human-powered vehicle control device according to any one of the first to tenth aspects is configured so that the electric component includes at least one of a display device, an operation device, an electric transmission, a drive unit that applies propulsion force to the human-powered vehicle, an electric adjustable seatpost, and an electric suspension.

In accordance with the human-powered vehicle control device of the eleventh aspect, at least one of the display device, the operation device, the electric transmission, the drive unit for applying propulsion force to the human-powered vehicle, the electric adjustable seatpost, and the electric suspension is controlled using the third information.

In accordance with a twelfth aspect of the present disclosure, the human-powered vehicle control device according to any one of the first to eleventh aspects is configured so that the first information related to the human-powered vehicle includes at least one of information related to an electric transmission that changes a transmission ratio of the human-powered vehicle, information related to the transmission ratio changed by the electric transmission, information related to a vehicle speed of the human-powered vehicle, information related to a rotational speed of a crank of the human-powered vehicle, information related to a human driving force input to the human-powered vehicle, and information related to an inclination of the human-powered vehicle.

In accordance with the human-powered vehicle control device of the twelfth aspect, the second information is generated in accordance with the first information related to the electric transmission for changing the transmission ratio of the human-powered vehicle, the information related to the transmission ratio changed by the electric transmission, the information related to the vehicle speed of the human-powered vehicle, the information related to the rotational speed of the crank of the human-powered vehicle, the information related to the human driving force input to the human-powered vehicle, and the information related to the inclination of the human-powered vehicle.

In accordance with a thirteenth aspect of the present disclosure, the human-powered vehicle control device according to any one of the first to twelfth aspects is configured so that the first information related to the rider of the human-powered vehicle includes biological information of the rider.

In accordance with the human-powered vehicle control device of the thirteenth aspect, the second information is generated in accordance with the biological information of the rider.

In accordance with a fourteenth aspect of the present disclosure, the human-powered vehicle control device according to any one of the first to thirteenth aspects is configured so that the information related to the environment of the human-powered vehicle includes information related to a traveling route of the human-powered vehicle.

In accordance with the human-powered vehicle control device of the fourteenth aspect, the second information is generated in accordance with the information related to the traveling route of the human-powered vehicle.

A human-powered vehicle control device in accordance with a fifteenth aspect of the present disclosure comprises an artificial intelligence processor, an operation device, and a communication device. The artificial intelligence processor configured to generate second information for controlling an electric component of a human-powered vehicle in accordance with first information related to at least one of the human-powered vehicle, a rider of the human-powered vehicle, and an environment of the human-powered vehicle. The operation device operates the electric component. The communication device is configured to communicate with an external device. The communication device is configured to transmit the first information and information related to an operation of the operation device to the external device and receives third information related to a process for generating the second information from the external device.

In accordance with the human-powered vehicle control device of the fifteenth aspect, the electric component is controlled in accordance with the second information generated using the third information received from the external device. For example, in a case where the human-powered vehicle control device is not executing control that would be optimal for the rider, receipt of the third information will allow for execution of control that is optimal for the rider. This improves usability.

An electronic device in accordance with a sixteenth aspect of the present disclosure comprises a receiver, an artificial intelligence processor, and a transmitter. The receiver is configured to receive the first information and information related to an operation of the operation device transmitted from a communication device of the human-powered vehicle control device of the fifteenth aspect. The artificial intelligence processor is configured to generate third information related to a process for generating the second information in accordance with the first information and the operation of the operation device. The transmitter is configured to transmit the third information generated by the artificial intelligence processor to the communication device of the human-powered vehicle control device.

In accordance with the electronic device of the sixteenth aspect, the human-powered vehicle control device generates the second information using the third information generated by the electronic device. This improves usability. Furthermore, since the process for generating the second information is performed outside the human-powered vehicle control device, the calculation load on the artificial intelligence processor of the human-powered vehicle control device is reduced.

A human-powered vehicle control system in accordance with a seventeenth aspect of the present disclosure comprises the human-powered vehicle control device of the fifteenth aspect and the electronic device of the sixteenth aspect.

In accordance with the human-powered vehicle control system of the seventeenth aspect, the human-powered vehicle control device controls the electric component in accordance with the second information generated using the third information received from the electronic device. This improves usability.

The human-powered vehicle control device, the electronic device, and the human-powered vehicle control system in accordance with the present disclosure improve usability.

BRIEF DESCRIPTION OF THE DRAWINGS

FIG. 9 is a block diagram showing the electrical configuration of a human-powered vehicle control system in accordance with a second embodiment.

FIG. 10 is a block diagram showing the electrical configuration of a human-powered vehicle control device in accordance with a modified example.

EMBODIMENTS OF THE DISCLOSURE

Figure 1:
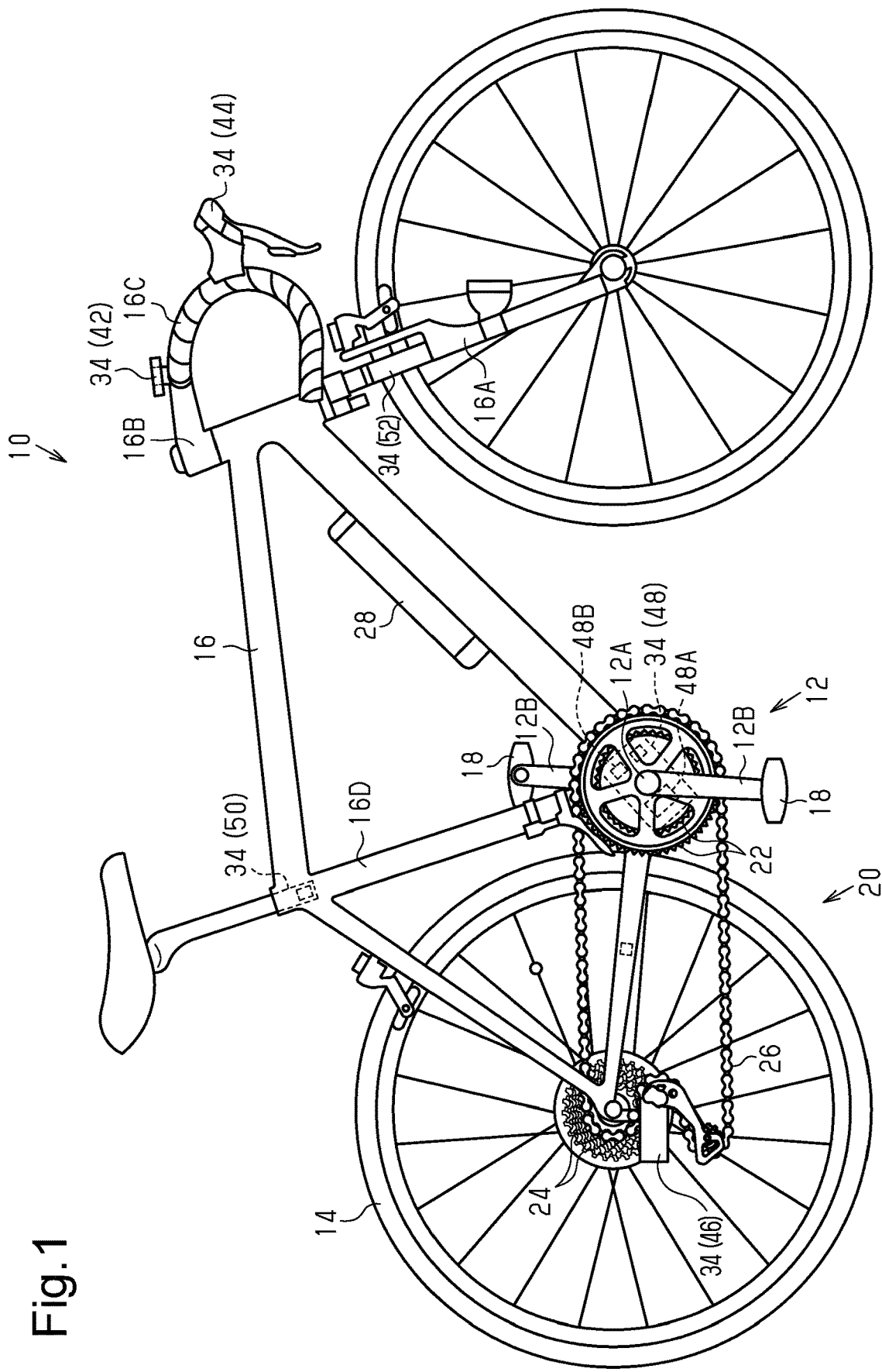
FIG. 1 is a side view of a human-powered vehicle including a human-powered vehicle control device in accordance with a first embodiment.
Figure 2:
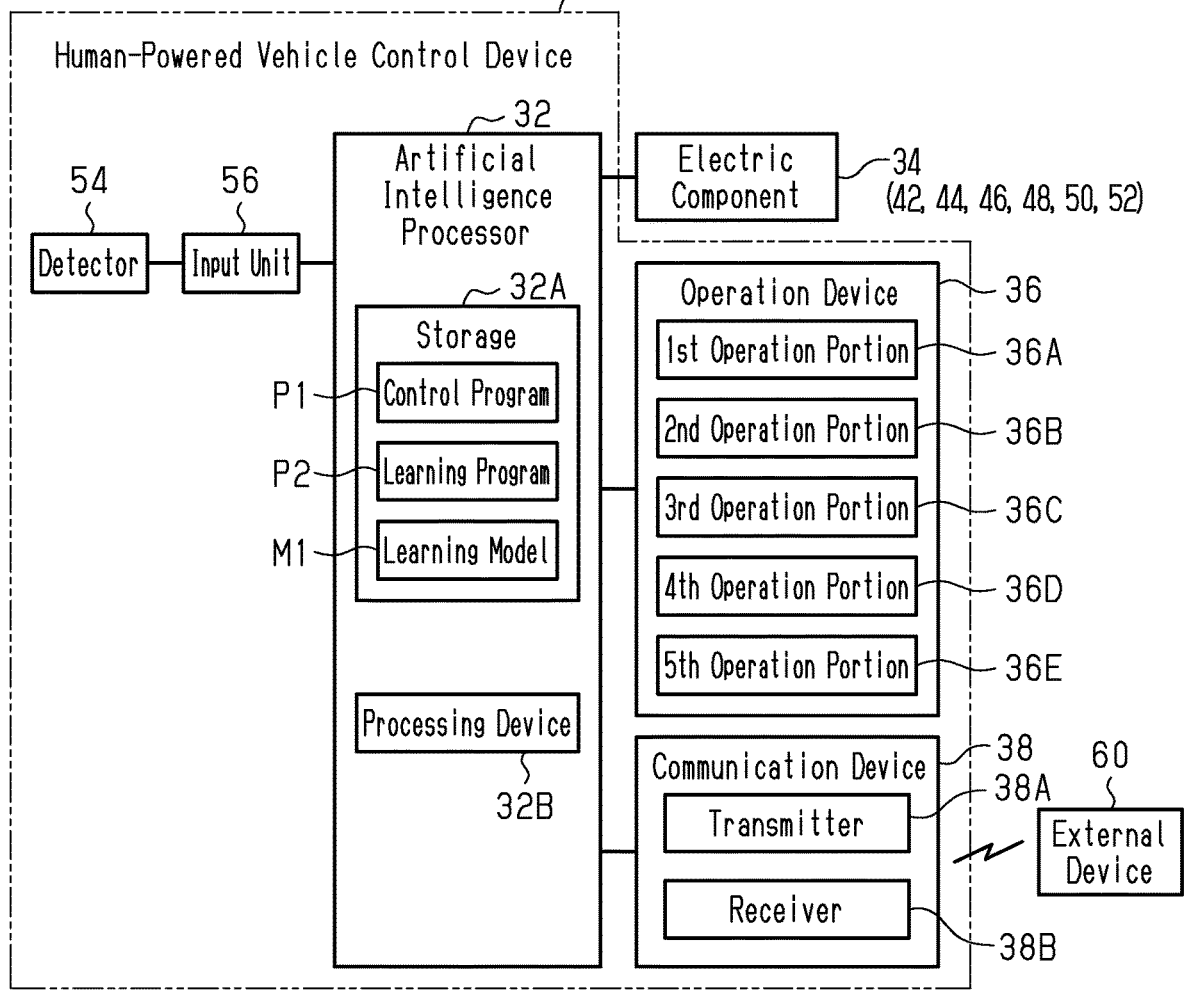
FIG. 2 is a block diagram showing the electrical configuration of the human-powered vehicle control device in accordance with the first embodiment.
Figure 3:
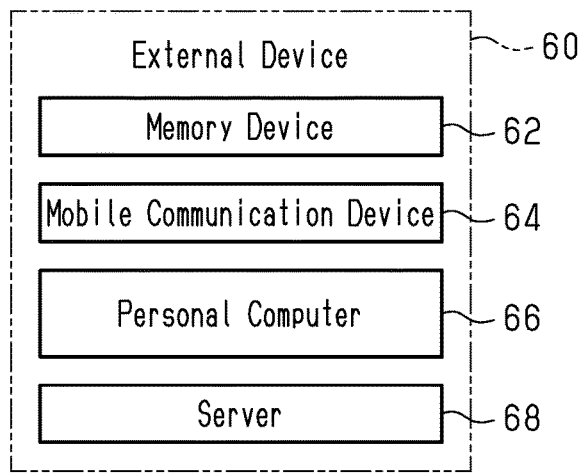
FIG. 3 is a block diagram showing the configuration of an external device of FIG. 2.
Figure 4:
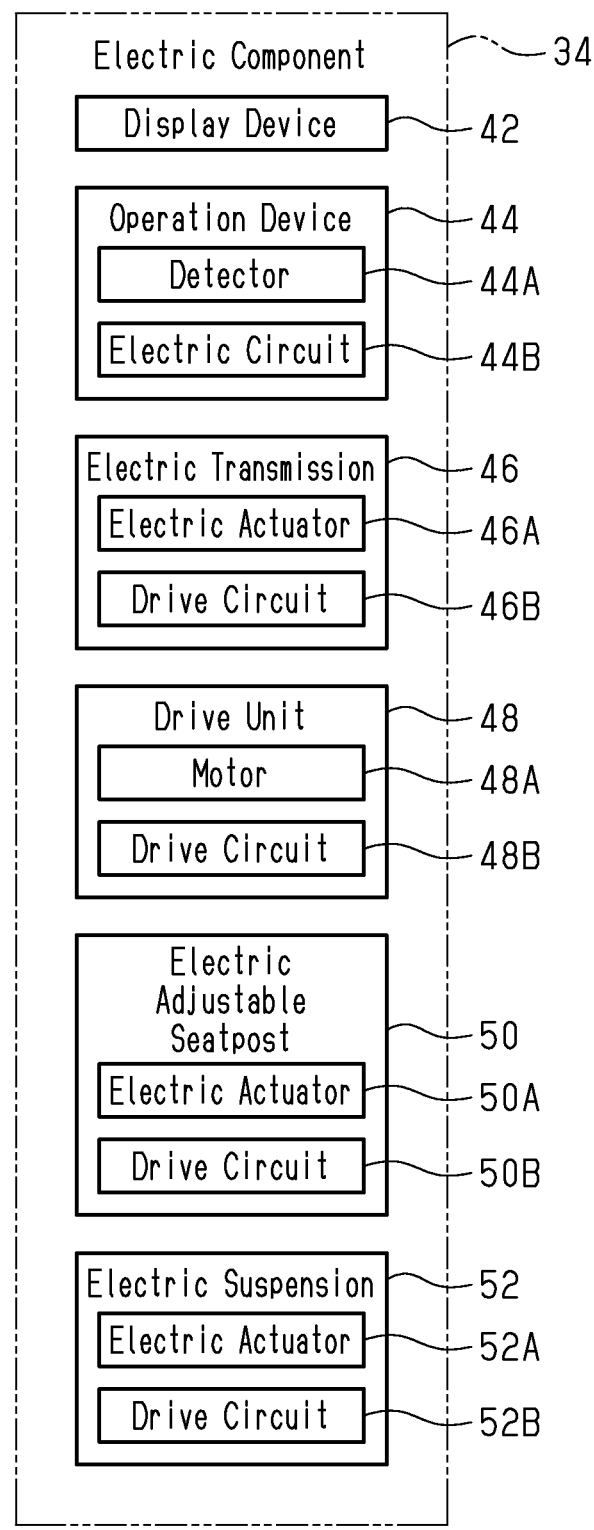
FIG. 4 is a block diagram showing the configuration of an electric component of FIG. 2.

The expression "at least one" as used in the present specification means "one or more" of the desired options. As an example, the expression "at least one" as used in the present specification means "only one option" or "both of two options" if the number of options is two. As another example, the expression "at least one" as used in the present specification can be "only one option" or "combination of two or more arbitrary options" if the number of options is three or more.

First Embodiment

A human-powered vehicle control device 30 in accordance with a first embodiment will now be described with reference to FIGS. 1 to 8. The human-powered vehicle control device 30 is used in the human-powered vehicle 10. The human-powered vehicle 10 is a vehicle that is configured to be driven by at least a human driving force. The human-powered vehicle 10 includes, for example, a bicycle. There is no limit to the number of wheels of the human-powered vehicle 10. Thus, the human-powered vehicle 10 includes a unicycle and a vehicle having, for example, three or more wheels. The human-powered vehicles include various types of bicycles such as mountain bikes, road bikes, city bikes, cargo bikes, and recumbent bikes, and electric bicycles (E-bike). The electric bicycle includes an electric assist bicycle that assists propulsion of a vehicle by an electric motor. Hereinafter, the human-powered vehicle 10 will be described as a bicycle in the embodiment.

The human-powered vehicle 10 includes a crank 12 and a drive wheel 14. The human-powered vehicle 10 further includes a frame 16. A human driving force is input to the crank 12. The crank 12 includes a crankshaft 12A rotatable relative to the frame 16 and crank arms 12B respectively provided on the axial ends of the crankshaft 12A. A pedal 18 is connected to each crank arm 12B. The drive wheel 14 is driven by the rotation of the crank 12. The drive wheel 14 is supported by the frame 16. The crank 12 and the drive wheel 14 are connected by a drive mechanism 20. The drive mechanism 20 includes a first rotary body 22 coupled to the crankshaft 12A. The crankshaft 12A and the first rotary body 22 can be coupled by a first one-way clutch. The first one-way clutch is configured so as to rotate the first rotary body 22 forward in a case where the crank 12 rotates forward and not rotate the first rotary body 22 backward in a case where the crank 12 rotates backward. The first rotary body 22 includes a sprocket, a pulley, or a bevel gear. The drive mechanism 20 further includes a second rotary body 24 and a linking member 26. The linking member 26 transmits the rotational force of the first rotary body 22 to the second rotary body 24. The linking member 26 includes, for example, a chain, a belt, or a shaft.

The second rotary body 24 is connected to the drive wheel 14. The second rotary body 24 includes a sprocket, a pulley, or a bevel gear. Preferably, a second one-way clutch is provided between the second rotary body 24 and the drive wheel 14. The second one-way clutch is configured to rotate the drive wheel 14 forward in a case where the second rotary body 24 rotates forward and not rotate the drive wheel 14 backward in a case where the second rotary body 24 rotates backward.

The human-powered vehicle 10 includes a front wheel and a rear wheel. The front wheel is attached to the frame 16 by a front fork 16A. A handlebar 16C is connected to the front fork 16A by a stem 16B. In the embodiments described hereafter, the rear wheel will be described as the drive wheel 14. However, the front wheel can be the drive wheel 14.

The human-powered vehicle 10 further includes a battery device 28. The battery device 28 includes one or more battery cells. The battery cell includes a rechargeable battery. The battery device 28 is provided in the human-powered vehicle 10 and supplies electric power to another electric component, for example, the human-powered vehicle control device 30, that is electrically connected to the battery device 28 by a wire. The battery device 28 is connected to the human-powered vehicle control device 30 to communicate with the human-powered vehicle control device 30 through wired or wireless connection. The battery device is configured to communicate with the human-powered vehicle control device 30 through, for example, power line communication (PLC). The battery device 28 can be attached to the outside of the frame 16 or can be at least partially accommodated in the frame 16. The battery device 28 can be provided on the human-powered vehicle control device 30.

The human-powered vehicle control device 30 includes an artificial intelligence processor 32, an operation device 36 for operating the electric component 34, and a communication device 38 configured to communicate with an external device 60. The artificial intelligence processor 32 is configured to generate second information for controlling the electric component 34 of the human-powered vehicle 10 in accordance with first information related to at least one of the human-powered vehicle 10, the rider of the human-powered vehicle 10, and the environment of the human-powered vehicle 10. The artificial intelligence processor 32 is configured to change the process for generating the second information in accordance with the first information and the operation of the operation device 36. The communication device 38 is configured to transmit third information related to the process for generating the second information to the external device 60.

The human-powered vehicle control device 30 includes the artificial intelligence processor 32 and the communication device 38. The artificial intelligence processor 32 is configured to generate second information for controlling the electric component of the human-powered vehicle 10 in accordance with first information related to at least one of the human-powered vehicle 10, the rider of the human-powered vehicle 10, and the environment of the human-powered vehicle 10. The communication device 38 receives the third information related to the process for generating the second information transmitted from the external device 60.

The operation device 36 is connected to the artificial intelligence processor 32 to communicate with the artificial intelligence processor 32 through wired or wireless connection. The operation device 36 is configured to communicate with the artificial intelligence processor 32 through, for example, power line communication (PLC). The operation device 36 each includes, for example, an operation member, a detector that detects the movement of the operation member, and an electric circuit that communicates with the artificial intelligence processor 32 in accordance with an output signal of the detector. In a case where the operation member is operated by a user, the electric circuit is configured to transmit a signal corresponding to the output signal of the detector to the artificial intelligence processor 32. The operation member and the detector that detects movement of the operation member are configured by a push switch, a lever type switch, or a touch panel. The operation device 36 is provided, for example, on the handlebar 16C.

The communication device 38 includes a transmitter 38A and a receiver 38B. The communication device 38 can be configured to perform only one of transmission of the third information to the external device 60 and reception of the third information from the external device 60. In this case, the one of the transmitter 38A and the receiver 38B that is not used can be omitted. In a case where the communication device 38 performs only reception of the third information from the external device 60, the human-powered vehicle control device 30 does not have to include the operation device 36.

The artificial intelligence processor 32 includes storage 32A that stores software and a processing device 32B that executes the software stored in the storage 32A. The processing device 32B includes, for example, a central processing unit (CPU) or a micro-processing unit (MPU). Preferably, the processing device 32B includes a graphics processing unit (GPU) in addition to the CPU or the MPU. The processing device 32B can include a field-programmable gate array (FPGA). The artificial intelligence processor 32 can include one or more processing devices. The artificial intelligence processor 32 can include a plurality of processing devices 32B located at separate positions. The processing device 32B executes control program P1 stored in the storage 32A.

The storage 32A includes, for example, a nonvolatile memory and a volatile memory. The artificial intelligence processor 32 is configured to change the process for generating the second information in accordance with the first information and the operation of the operation device 36. The storage 32A stores control program P1, learning program P2, and learning model M1. The change of the process for generating the second information is implemented by changing learning model M1. In the present embodiment, learning model M1 is a learned model learned by a predetermined learning algorithm. The learning algorithm includes machine learning, deep learning or deep reinforcement learning. The learning algorithm includes, for example, at least one of supervised learning, unsupervised learning, and reinforcement learning. As a learning algorithm, methods other than the method described in the present specification can be used as long as it is configured to update the learning models M1 using a method belonging to the field of artificial intelligence. Preferably, the learning process for updating learning model M1 is performed by the GPU. The learning algorithm can use a neural network (NN). The learning algorithm can use a recurrent neural network. The artificial intelligence processor 32 operates in the learning mode and the control mode. In a case where the artificial intelligence processor 32 operates in the learning mode, the artificial intelligence processor 32 updates learning model M1 with the learning algorithm based on the first information, the operation of the operation device 36, and learning program P2. In a case where the artificial intelligence processor 32 operates in the control mode, the artificial intelligence processor 32 outputs the second information by processing the first information using learning model M1 based on control program P1.

For example, the artificial intelligence processor 32 is configured to generate the second information for changing the control state of the electric component 34 in accordance with a change in the first information. For example, the artificial intelligence processor 32 is configured to change the process for generating the second information so as to suit the rider preference by learning the first information in a case where the rider operates the operation device 36 to change the control state of the electric component 34. The third information includes information for generating the second information. The third information includes at least one of learning model M1, information related to weight, and information related to bias. The artificial intelligence processor 32 is configured to change the second information in accordance with the third information. The artificial intelligence processor 32 is configured to change the process for generating the second information in accordance with the third information. The artificial intelligence processor 32 further includes storage 32A that stores the third information. Preferably, the third information includes predetermined identification information of an individual. The artificial intelligence processor 32 is configured to change the process for generating the second information in accordance with the third information in a case where the received third information corresponds to predetermined identification information of an individual. The artificial intelligence processor 32 does not change the process for generating the second information in a case where the received third information does not correspond to the predetermined identification information of an individual. The artificial intelligence processor 32 can select and receive specific third information from among the plurality of third information using identification information of the individual. Further, the artificial intelligence processor 32 can select the specific third information from among the plurality of third information received using the identification information of the individual and is configured to change the process for generating the second information.

The external device 60 includes at least one of a memory device 62, a mobile communication device 64, a personal computer 66, and a server 68 connected to the Internet. The memory device 62 includes, for example, at least one of a Universal Serial Bus (USB) flash drive, a hard disk drive, and a memory card. The mobile communication device 64 includes, for example, at least one of a smartphone and a tablet computer.

Preferably, the communication device 38 is configured to receive the third information through wireless communication. Preferably, the communication device 38 is configured to transmit the third information through wireless communication. Examples of the wireless communication standard performed by the communication device 38 and the external device 60 include ANT+ (registered trademark) and Bluetooth (registered trademark). Preferably, the communication device 38 includes a wireless communication device. The communication device 38 can be configured to communicate with the external device 60 through, for example, at least one of a wireless local area network (LAN) and a public communication network. In a case where the communication device 38 performs wireless communication with the external device 60, the external device 60 can include, for example, a wireless communication device configured to communicate with the communication device 38 through wireless connection. Alternatively, the external device 60 can be wireless-connected to a wireless communication device to communicate with a wireless communication device configured to communicate with the communication device 38 through wireless connection.

Preferably, the human-powered vehicle 10 further includes an electric component 34. The electric component 34 includes at least one of a display device 42, an operation device 44, an electric transmission 46, a drive unit 48 that applies propulsion force to the human-powered vehicle 10, an electric adjustable seatpost 50, and an electric suspension 52. The human-powered vehicle control device 30 can be separate from the electric component 34 and at least a part thereof can be included in the electric component 34. In a case where at least part of the human-powered vehicle control device 30 is included in the electric component 34, at least part of the human-powered vehicle control device 30 is provided on the electric component 34. Further, at least part of the human-powered vehicle control device 30 provided on the electric component 34 includes the artificial intelligence processor 32.

The display device 42 includes at least one of a liquid crystal and an organic electro-luminescence (EL) display. The display device 42 can be a touch panel. Preferably, the display device 42 includes a cycle computer. The display device 42 is provided, for example, on the handlebar 16C. The display device 42 can include a speaker.

The operation device 44 is connected to the artificial intelligence processor 32 to communicate with the artificial intelligence processor 32 through wired or wireless connection. The operation device 44 is configured to communicate with the artificial intelligence processor 32 through, for example, power line communication (PLC). The operation device 44 includes, for example, an operation member, a detector 44A that detects the movement of the operation member, and an electric circuit 44B that communicates with the artificial intelligence processor 32 in accordance with an output signal of the detector 44A. In a case where the operation member is operated by a user, the electric circuit 44B transmits a signal corresponding to the output signal of the detector 44A to the artificial intelligence processor 32. The operation member and the detector 44A that detects the movement of the operation member are configured by a push switch, a lever type switch, or a touch panel. The operation device 44 is provided, for example, on the handlebar 16C.

Although the operation device 36 can be used as the operation device 44, the operation device 44 can be configured separately from the operation device 36.

The electric transmission 46 is configured to change the ratio of the rotational speed of the drive wheel 14 to the rotational speed of the rotary body to which the human driving force is input. The rotary body to which the human driving force is input includes the crank 12. The electric transmission 46 is configured to be driven by an electric actuator 46A. The electric transmission 46 further includes a drive circuit 46B that controls the electric power supplied to the electric actuator 46A. The drive circuit 46B drives the electric actuator 46A in accordance with a control signal from the artificial intelligence processor 32. The electric actuator 46A includes an electric motor. The electric transmission 46 is used to change the ratio of the rotational speed of the drive wheel 14 to the rotational speed of the crank 12. In the present embodiment, the electric transmission 46 is configured to change, in steps, the ratio of the rotational speed of the drive wheel 14 to the rotational speed of the crank 12. The electric actuator 46A performs a shift operation with the electric transmission 46. The electric actuator 46A is connected to the artificial intelligence processor 32 to communicate with the artificial intelligence processor 32 through wired or wireless connection. The electric actuator 46A is configured to communicate with the artificial intelligence processor 32, for example, through power line communication (PLC). The electric actuator 46A performs a shift operation with the electric transmission 46 in accordance with a control signal from the artificial intelligence processor 32. The electric transmission 46 includes at least one of an internal transmission device and an external transmission device (derailleur).

The drive unit 48 includes a motor 48A. The drive unit 48 further includes a drive circuit 48B. Preferably, the motor 48A and the drive circuit 48B are provided on the same housing. The drive circuit 48B controls the electric power supplied from the battery device 28 to the motor 48A. The drive circuit 48B is connected to the artificial intelligence processor 32 to communicate with the artificial intelligence processor 32 through wired or wireless connection. The drive circuit 48B is configured to communicate with the artificial intelligence processor 32 through, for example, serial communication. The drive circuit 48B drives the motor 48A in accordance with a control signal from the artificial intelligence processor 32. The motor 48A includes an electric motor. The motor 48A is provided in a power transmission path of the human driving force from the pedal 18 to the rear wheel or provided to transmit the rotation to the front wheel. The motor 48A is provided on the frame 16, the rear wheel, or the front wheel of the human-powered vehicle 10. In one example, the motor 48A is coupled to a power transmission path from the crankshaft 12A to the first rotary body 22. Preferably, a one-way clutch is provided on the power transmission path between the motor 48A and the crankshaft 12A so that the motor 48A is not rotated by the rotational force of the crank 12 in a case where the crankshaft 12A is rotated in the direction in which the human-powered vehicle 10 moves forward. The housing in which the motor 48A and the drive circuit 48B are provided can be provided with components other than the motor 48A and the drive circuit 48B, and for example, can be provided with a reduction gear that decelerates and outputs the rotation of the motor 48A.

The electric adjustable seatpost 50 includes an electric actuator 50A. The electric adjustable seatpost 50 further includes a drive circuit 50B that controls the electric power supplied to the electric actuator 50A. The electric actuator 50A includes an electric motor. The electric motor included in the electric actuator 50A can be replaced by a solenoid. The drive circuit 50B drives the electric actuator 50A in accordance with a control signal from the artificial intelligence processor 32. The electric adjustable seatpost 50 is provided on the seat tube 16D and is configured to change the height of the saddle. The electric adjustable seatpost 50 includes an electric seatpost, in which the seatpost is extended or retracted by the force of the electric actuator, or a mechanical seatpost, in which the seatpost is extended with at least one of the force of spring and pneumatic force controlled with a valve by the electric actuator 50A and retracted using manual force. The mechanical seatpost includes hydraulic seatpost or hydraulic-pneumatic seatpost.

The electric suspension 52 includes an electric actuator 52A for operating the electric suspension 52. The electric suspension 52 further includes a drive circuit 52B that controls the electric power supplied to the electric actuator 52A. The electric actuator 52A includes an electric motor. The electric motor included in the electric actuator 52A can be replaced by a solenoid. The drive circuit 52B drives the electric actuator 52A in accordance with a control signal from the artificial intelligence processor 32. The electric suspension 52 includes at least one of a front suspension and a rear suspension. The electric suspension 52 absorbs an impact applied to the wheel. The electric suspension 52 can be a hydraulic suspension or an air suspension. The electric suspension 52 includes a first portion and a second portion, which is fitted to the first portion and is movable relative to the first portion. The operational state of the electric suspension 52 includes a locked state, in which relative movement between the first portion and the second portion is restricted, and an unlocked state, in which relative movement between the first portion and the second portion is permitted. The electric actuator 52A switches the operational state of the electric suspension 52. The locked state of the electric suspension 52 can include a state where the first portion and the second portion slightly move relative to each other in a case where a strong force is applied to the wheel. Instead of or in addition to the locked state and the unlocked state, the operational state of the electric suspension 52 can include at least one of a plurality of operational states with different damping forces and a plurality of operational states with different stroke amounts.

The rear suspension is configured to be provided between portions of the frame 16 of the human-powered vehicle 10. More specifically, the rear suspension is provided between a frame body of the frame 16 and a swing arm that supports the rear wheel. The rear suspension absorbs the impact applied to the rear wheel. The front suspension is configured to be provided between the frame 16 of the human-powered vehicle 10 and the front wheel. More specifically, the front suspension is provided on the front fork 16A. The front suspension absorbs the impact applied to the front wheel.

The operation device 36 includes at least one of a first operation portion 36A for changing the operational state of the display device 42, a second operation portion 36B for operating the electric transmission 46, a third operation portion 36C for changing the operational state of the drive unit 48, a fourth operation portion 36D for changing the operational state of the electric adjustable seatpost 50, and a fifth operation portion 36E for changing the operational state of the electric suspension 52. The first operation portion 36A includes, for example, an operation device for changing the content displayed on the display device 42. The second operation portion 36B includes, for example, an operation device for changing the transmission ratio. The third operation portion 36C includes, for example, an operation device for changing the operation mode of the drive unit 48. The operation mode of the drive unit 48 includes a plurality of operation modes with different assist forces by the motor 48A. The fourth operation portion 36D includes, for example, an operation device for changing the height of the electric adjustable seatpost 50. The fifth operation portion 36E includes, for example, an operation device for changing the hardness of the electric suspension 52.

The operation device 36 can include the crank 12. Preferably, in this case, the operation device 36 includes a crank rotation sensor. The crank rotation sensor is used to detect the rotational speed of the crank 12. The crank rotation sensor is attached to the housing of the frame 16 or the drive unit 48 of the human-powered vehicle 10. The crank rotation sensor is configured to include, for example, a magnetic sensor that outputs a signal corresponding to an intensity of the magnetic field. An annular magnet of which magnetic field intensity changes in the circumferential direction is provided on the crankshaft 12A, on a member that rotates in cooperation with the crankshaft 12A, or in a power transmission path between the crankshaft 12A and the first rotary body 22. The crank rotation sensor outputs a signal corresponding to the rotational speed of the crank 12. The magnet can be provided on a member that rotates integrally with the crankshaft 12A in the power transmission path of the human driving force from the crankshaft 12A to the first rotary body 22. For example, the magnet can be provided on the first rotary body 22 in a case where the first one-way clutch is not provided between the crankshaft 12A and the first rotary body 22. The crank rotation sensor can include an optical sensor, an acceleration sensor, a torque sensor instead of the magnetic sensor, or the like.

Preferably, the human-powered vehicle control device 30 further includes a detector 54 that detects the first information. Preferably, the human-powered vehicle control device 30 further includes an input unit 56. Preferably, the input unit 56 is provided on the same housing as the artificial intelligence processor 32. The detector 54 can be provided on a housing that differs from the housing on which the artificial intelligence processor 32 is provided. The output of the detector 54 is input to the input unit 56. The detector 54 can be electrically connected to the input unit 56 by an electrical cable or through wireless communication. The input unit 56 includes an interface circuit and can include, for example, at least one of a connector and a wireless communication device.

The information related to the human-powered vehicle 10 includes at least one of information related to the electric transmission 46 for changing the transmission ratio of the human-powered vehicle 10, information related to the transmission ratio to be changed by the electric transmission 46, information related to the vehicle speed of the human-powered vehicle 10, information related to the rotational speed of the crank of the human-powered vehicle 10, information related to the human driving force input to the human-powered vehicle 10, and information related to the inclination of the human-powered vehicle 10.

The transmission ratio changed by the electric transmission 46 is the ratio of the rotational speed of the drive wheel 14 to the rotational speed of the rotary body to which the human driving force is input.

Preferably, in a case where the first information includes information related to the electric transmission 46, the detector 54 includes a state detection sensor that detects the state of the electric transmission 46. The state detection sensor detects the current shift stage of the electric transmission 46. The state detection sensor detects physical movement of the electric transmission 46, the electric actuator, and the like. The state detection sensor includes, for example, a sensor such as a potentiometer and a Hall element.

In a case where the first information includes information related to the transmission ratio, the detector 54 includes a vehicle speed sensor and a crank rotation sensor. The vehicle speed sensor is used to detect the rotational speed of the wheel of the human-powered vehicle 10. The vehicle speed sensor outputs a signal corresponding to the rotational speed of the wheel. The crank rotation sensor is used to detect the rotational speed of the crank 12. The crank rotation sensor outputs a signal corresponding to the rotational speed of the crank 12. The transmission ratio corresponds to the ratio of the rotational speed of the crank 12 and the rotational speed of the wheel. In a case where the first information includes information related to the transmission ratio, the detector 54 can include at least one of a detector that detects the control signal transmitted from a controller that controls the electric transmission 46, and a detector that detects an operation signal of the second operation portion 36B for operating the electric transmission 46.

Preferably, in a case where the first information includes information related to the vehicle speed, the detector 54 includes a vehicle speed sensor. The vehicle speed sensor is used to detect the rotational speed of the wheel of the human-powered vehicle 10. The vehicle speed sensor outputs a signal corresponding to the rotational speed of the wheel. The artificial intelligence processor 32 calculates the vehicle speed of the human-powered vehicle 10 based on the rotational speed of the wheel. Preferably, the vehicle speed sensor includes a magnetic reed forming a reed switch or a Hall element. The vehicle speed sensor can be mounted on a chain stay of the frame 16 of the human-powered vehicle 10 to detect a magnet attached to the rear wheel or can be provided on the front fork 16A to detect a magnet attached to the front wheel. In a case where the first information includes information related to the vehicle speed, the detector 54 does not include the vehicle speed sensor, and the detector 54 can include a global positioning system (GPS) receiver and a storage that stores map information. In this case, the artificial intelligence processor 32 is configured to calculate the vehicle speed of the human-powered vehicle 10 in accordance with the position information received by the GPS receiver, the map information, and a timer included in the artificial intelligence processor 32.

Preferably, in a case where the first information includes information related to the rotational speed of the crank 12, the detector 54 includes a crank rotation sensor. The crank rotation sensor included in the detector 54 is configured in the same manner as the crank rotation sensor included in the operation device 36. The crank rotation sensor included in the operation device 36 is used as the crank rotation sensor of the detector 54. However, the crank rotation sensor of the detector 54 can be configured separately from the crank rotation sensor of the operation device 36.

Preferably, in a case where the first information includes the human driving force, the detector 54 includes a torque sensor. The torque sensor is used to detect a torque of the human driving force input to the crank 12. For example, in a case where the first one-way clutch is provided in the power transmission path, the torque sensor is provided on the upstream side of the first one-way clutch in the power transmission path. The torque sensor includes a strain sensor, a magnetostrictive sensor, a pressure sensor, or the like.

The strain sensor includes a strain gauge. The torque sensor is provided in the power transmission path, the vicinity of a member included in the power transmission path, or the like. The strain sensor includes a strain gauge. The torque sensor is provided in a member included in the power transmission path. The member included in the power transmission path is, for example, the crankshaft 12A, the crank arm 12B, or the pedal 18. The torque sensor can include a wireless or wired communication device. The human driving force can include the power of the human driving force. Preferably, in this case, the detector 54 includes a torque sensor and a crank rotation sensor, respectively.

Preferably, in a case where the first information includes information related to the inclination of the human-powered vehicle 10, the detector 54 includes an inclination sensor. The inclination sensor is provided on the human-powered vehicle 10 and detects the inclination angle of the human-powered vehicle 10. The inclination angle of the human-powered vehicle 10 includes at least one of a pitch angle, a roll angle, and a yaw angle. The inclination sensor includes, for example, at least one of a gyro sensor and an acceleration sensor.

The information related to the rider of the human-powered vehicle 10 includes biological information of the rider. Preferably, in a case where the first information includes the physical condition of the rider, the detector 54 includes at least one of a heart rate sensor, a brain wave sensor, and a myoelectric sensor.

The information related to the environment of the human-powered vehicle 10 includes the information related to the traveling route of the human-powered vehicle 10. Preferably, in a case where the first information includes information related to the traveling route of the human-powered vehicle 10, the detector includes a GPS receiver and a storage that stores map information. The map information can be acquired from an external device electrically connected to the detector 54.

Figure 5:
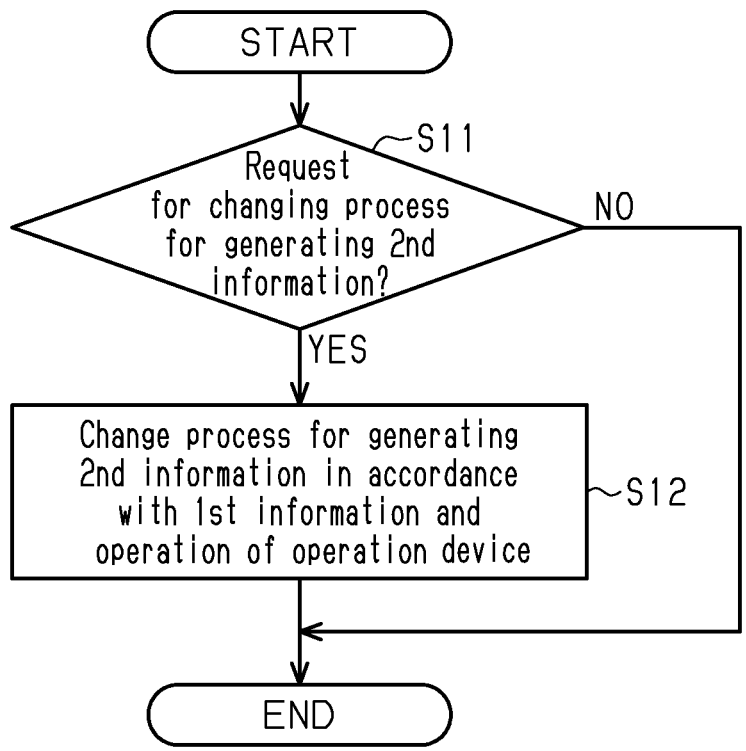
FIG. 5 is a flowchart of a process for changing a process for generating second information executed by an artificial intelligence processor of FIG. 2.

A process for generating the second information in accordance with the first information and the operation of the operation device 36 will now be described with reference to FIG. 5. In a case where electric power is supplied to the artificial intelligence processor 32, the artificial intelligence processor 32 starts the process and proceeds to step S11 of the flowchart shown in FIG. 5.

In step S11, the artificial intelligence processor 32 determines whether or not there is a request for changing the process for generating the second information. For example, in a case where the operation device 36 is operated or in a case where the learning mode is set, the artificial intelligence processor 32 determines that there has been a request for changing the process for generating the second information. The artificial intelligence processor 32 ends the process in a case where there has been no request for the changing the process for generating the second information. The artificial intelligence processor 32 proceeds to step S12 in a case where there has been a request for changing the process for generating the second information.

In step S12, the artificial intelligence processor 32 is configured to change the process for generating the second information in accordance with the first information and the operation of the operation device 36 and then ends the process. In step S12, the process for generating the second information is updated. In step S12, the artificial intelligence processor 32 updates learning model M1 in accordance with the first information and the operation of the operation device 36. The artificial intelligence processor 32 operates in the learning mode in step S12 and generates learning model M1 with a learning algorithm based on learning program P2.

In a case where the artificial intelligence processor 32 is operated in the control mode, the artificial intelligence processor 32 outputs the second information by processing the first information using learning model M1 based on control program P1. The artificial intelligence processor 32 can control the electric component 34 in accordance with the generated second information and can transmit the second information to the controller that controls the electric component 34 so that the controller controls the electric component 34.

Figure 6:
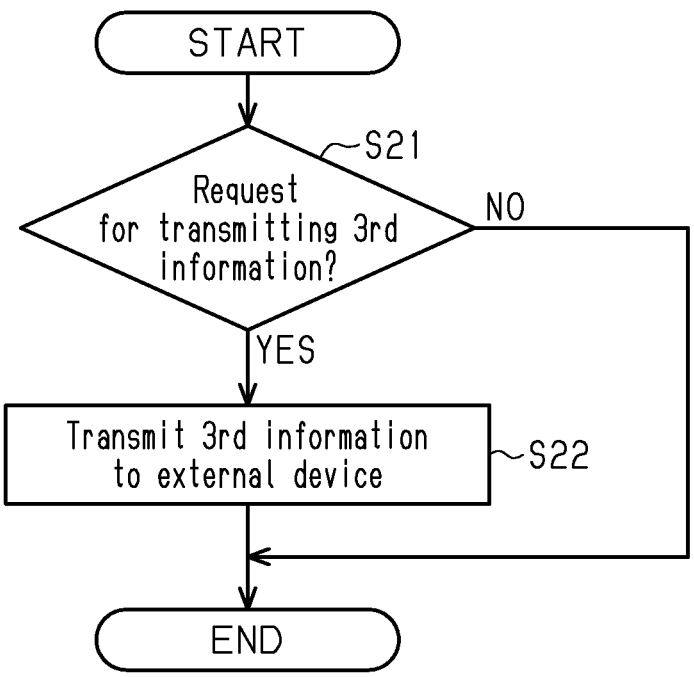
FIG. 6 is a flowchart of a process for transmitting third information to the external device executed by the artificial intelligence processor of FIG. 2.

A process for transmitting the third information to the external device 60 will now be described with reference to FIG. 6. In a case where electric power is supplied to the artificial intelligence processor 32, the artificial intelligence processor 32 starts the process and proceeds to step S21 of the flowchart shown in FIG. 6.

In step S21, the artificial intelligence processor 32 determines whether or not there has been a request for transmitting the third information. For example, in a case where an operation for transmitting the third information is performed through the operation device 36, the operation device 44, or the like, the artificial intelligence processor 32 can determine that there has been a transmission request for the third information. In a case where a predetermined time or a predetermined time has elapsed, the artificial intelligence processor 32 can determine that there has been a transmission request for the third information. In a case where the communication device 38 receives the transmission request signal of the third information from the external device 60, the artificial intelligence processor 32 can determine that there has been a transmission request for the third information. In a case where there has been no transmission request for the third information, the artificial intelligence processor 32 ends the process. In a case where there has been a transmission request for the third information, the artificial intelligence processor 32 proceeds to step S22. In step S22, the artificial intelligence processor 32 transmits the third information to the external device 60 and then ends the process.

Figure 7:
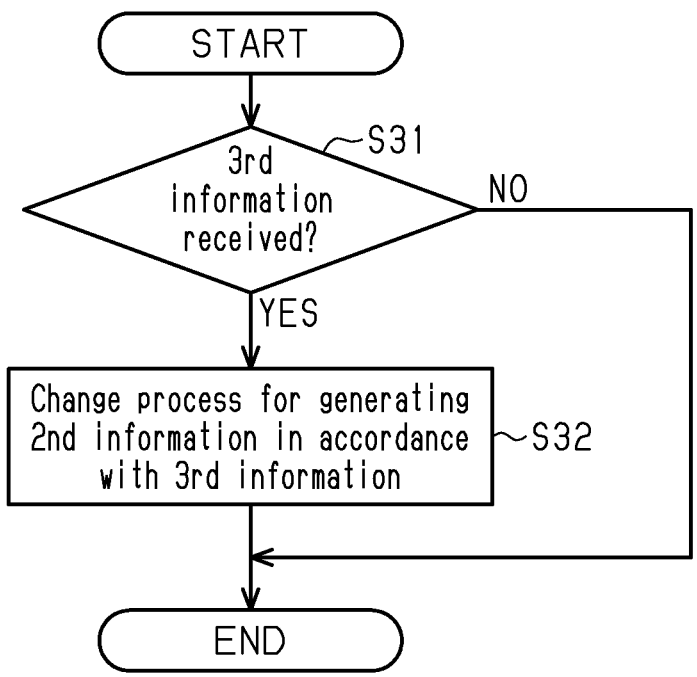
FIG. 7 is a flowchart of a process for changing the process for generating second information in accordance with the third information received from the external device executed by the artificial intelligence processor of FIG. 2.

A process for changing the process for generating the second information in accordance with the third information received from the external device 60 will now be described with reference to FIG. 7. In a case where electric power is supplied to the artificial intelligence processor 32, the artificial intelligence processor 32 starts the process and proceeds to step S31 of the flowchart shown in FIG. 7.

In step S31, the artificial intelligence processor 32 determines whether the third information has been received from the external device 60. In a case where the third information has not been received, the artificial intelligence processor 32 ends the process. In a case where the third information has been received, the artificial intelligence processor 32 proceeds to step S32.

In step S32, the artificial intelligence processor 32 changes the process for generating the second information in accordance with the third information and then ends the process. In step S32, the artificial intelligence processor 32 updates learning model M1 in accordance with the third information. In a case where the artificial intelligence processor 32 has received the third information from the external device 60, the artificial intelligence processor 32 can write the third information received from the external device 60 over the third information stored in the storage 32A.

The third information transmitted to the external device 60 can also be transmitted through the external device 60 to a human-powered vehicle control device 30 that differs from the human-powered vehicle control device 30 in which the third information is generated. Furthermore, the human-powered vehicle control device 30 can receive the third information generated by another human-powered vehicle control device 30 and is configured to change the process for generating the second information in accordance with the received third information.

Figure 8:
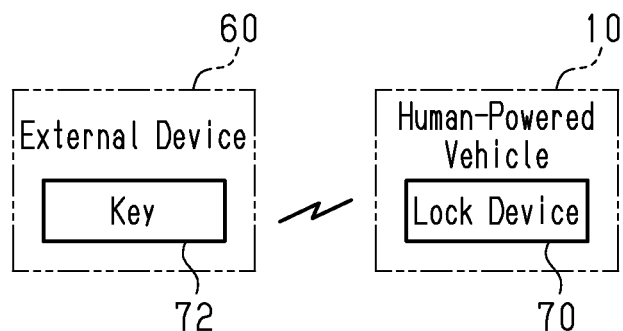
FIG. 8 is a block diagram showing another configuration of the external device of FIG. 2.

As shown in FIG. 8, the external device 60 can include a key 72 of a lock device 70 for restricting at least one of the traveling of the human-powered vehicle 10 and the operation of the electric component 34. Preferably, in a case where the lock device 70 restricts the traveling of the human-powered vehicle 10, the lock device 70 includes, for example, an electric actuator for switching between a first restricting state that restricts the traveling of the human-powered vehicle 10 and a first permitting state that permits the traveling. The lock device 70 is provided on at least one of the frame 16 of the human-powered vehicle 10 and the drive unit 48. Preferably, the lock device 70 is configured to restrict the rotation of at least one of the rear wheel, the front wheel, and the crankshaft 12A in the first restricting state. The lock device 70 can be configured to restrict or brake rotation of at least one of the rear wheel, the front wheel, and the crankshaft 12A, and can be configured in the first restricting state. The lock device 70 is configured not to restrict the rotation of the rear wheel, the front wheel, and the crankshaft 12A in the first permitting state.

In a case where the lock device 70 restricts the operation of the electric component 34, the lock device 70 switches between a second restricting state that restricts the operation of the electric component 34 and a second permitting state that does not restrict the operation. For example, in a case where the electric component 34 includes the drive unit 48, the driving of the motor 48A in the drive unit 48 is restricted if the lock device 70 is in the second restricting state.

Preferably, the key 72 of the lock device 70 includes an electronic key. The third information can be stored in the electronic key. For example, in a case where the key 72 is connected to the lock device 70, the artificial intelligence processor 32 can receive the third information from the key 72 and is configured to change the process for generating the second information in accordance with the received third information.

Second Embodiment

A human-powered vehicle control system 80 in accordance with a second embodiment will now be described with reference to FIG. 9. The human-powered vehicle control system 80 in accordance with the second embodiment is applied to the human-powered vehicle 10 having a similar configuration as the human-powered vehicle 10 in accordance with the first embodiment. Same reference numerals are given to those components that are the same as the corresponding components of the first embodiment. Such components will not be described in detail.

The human-powered vehicle control system 80 includes a human-powered vehicle control device 82 and an electronic device 84.

The human-powered vehicle control device 82 includes an artificial intelligence processor 32, an operation device 36 for operating the electric component 34, and a communication device 38 configured to communicate with an external device 60. The artificial intelligence processor 32 is configured to generate second information for controlling the electric component 34 of the human-powered vehicle 10 in accordance with first information related to at least one of the human-powered vehicle 10, the rider of the human-powered vehicle 10, and the environment of the human-powered vehicle 10. The communication device 38 is configured to transmit the first information and the information related to the operation of the operation device 36 to the external device 60 and receives the third information related to the process for generating the second information from the external device 60. Preferably, the human-powered vehicle control device 82 further includes an electric component 34, a detector 54, and an input unit 56.

The external device 60 includes the electronic device 84. The electronic device 84 includes at least one of a memory device 62, a mobile communication device 64, a personal computer 66, and a server 68 connected to the Internet. The electronic device 84 includes a receiver 86, an artificial intelligence processor 88, and a transmitter 90. The receiver 86 receives the first information transmitted from the communication device 38 of the human-powered vehicle control device 82 and the information related to the operation of the operation device 36. The artificial intelligence processor 88 is configured to generate the third information related to the process for generating the second information in accordance with the first information and the operation of the operation device 36. The transmitter 90 is configured to transmit the third information generated by the artificial intelligence processor 88 to the communication device 38 of the human-powered vehicle control device 82.

Preferably, the receiver 86 is configured to receive the first information and the information related to the operation of the operation device 36 through wireless communication. Preferably, the transmitter 38A of the communication device 38 is configured to transmit the history of the first information and the history of the information related to the operation of the operation device 36 to the receiver 86. Preferably, the transmitter 90 is configured to transmit the third information through wireless communication. At least one of the receiver 86 and the transmitter 90 can be configured to communicate with the communication device 38 through wired communication.

The artificial intelligence processor 88 includes storage 88A storing software, and a processing device 88B that executes software stored in the storage 88A. The processing device 88B includes, for example, a CPU or an MPU. Preferably, the processing device 88B includes a GPU in addition to a CPU or an MPU. The processing device 88B can include an FPGA. The artificial intelligence processor 88 can include one or more processing devices. The artificial intelligence processor 88 can include a plurality of processing devices 88B located at separate positions. The processing device 88B executes learning program P4 stored in the storage 88A.

The storage 88A includes, for example, a nonvolatile memory and a volatile memory. The artificial intelligence processor 88 is configured to change the process for generating the second information in accordance with the first information and the operation of the operation device 36. The storage 88A stores the control program P3, learning program P4, and learning model M2. The process for generating the second information is changed by changing learning model M2. In the present embodiment, learning model M2 is a learned model learned with a predetermined learning algorithm. Learning model M2 is a learned model that is configured to be used by control program P1 of the artificial intelligence processor 32 like learning model M1.

The learning algorithm includes machine learning, deep learning or deep reinforcement learning. The learning algorithm includes, for example, at least one of supervised learning, unsupervised learning, and reinforcement learning. As a learning algorithm, methods other than the method described in the present specification can be used as long as it is configured to update the learning models M2 using a method belonging to the field of artificial intelligence. Preferably, the learning process for updating learning model M2 is performed by the GPU. The learning algorithm can use a neural network. The learning algorithm can use a recurrent neural network. The artificial intelligence processor 88 operates in the learning mode and the control mode. In a case where the artificial intelligence processor 32 operates in the learning mode, the artificial intelligence processor 32 is configured to generate learning model M2 with the learning algorithm based on the first information, the operation of the operation device 36, and learning program P4. In a case where the artificial intelligence processor 32 operates in the control mode, the artificial intelligence processor 32 outputs the second information to the human-powered vehicle control device 82 by processing the first information using learning model M2 based on the control program P3.

For example, the artificial intelligence processor 88 is configured to generate the second information for changing the control state of the electric component 34 in accordance with the change of the first information. For example, the artificial intelligence processor 88 is configured to change the process for generating the second information so as to suit the rider preference by learning the first information in a case where the rider operates the operation device 36 to change the control state of the electric component 34. The third information includes information for generating the second information. The third information includes at least one of learning model M2, information related to weights, and information related to biases.

Preferably, the artificial intelligence processor 88 is configured to generate the third information for each piece of predetermined identification information of an individual. Specifically, the artificial intelligence processor 88 receives the identification information of an individual together with the first information and information related to the operation of the operation device 36 from the communication device 38 of the human-powered vehicle control device 82. The artificial intelligence processor 88 stores the first information and the information related to the operation of the operation device 36 for each piece of identification information of an individual. Preferably, the electronic device 84 further includes a storage 92 that stores the first information and the information related to the operation of the operation device 36 for each piece of identification information of an individual. The storage 92 can store the third information generated by the artificial intelligence processor 88.

The artificial intelligence processor 32 in accordance with the present embodiment does not have to store learning program P2. The storage 88A of the artificial intelligence processor 88 does not have to store the control program P3. The artificial intelligence processor 32 updates learning model M1 based on learning model M2 updated by learning program P4 of the artificial intelligence processor 88 and is configured to generate the second information in accordance with the updated learning model M1. In this case, the artificial intelligence processor 32 in accordance with the present embodiment does not have to operate in the learning mode, and the artificial intelligence processor 88 does not have to operate in the control mode.

Modified Examples

The description related with the above embodiments exemplifies, without any intention to limit, an applicable form of a human-powered vehicle control device, an electronic device, and a human-powered vehicle control system in accordance with the present disclosure. In addition to the embodiments described above, the human-powered vehicle control device, the electronic device, and the human-powered vehicle control system in accordance with the present disclosure is applicable to, for example, modified examples of the above embodiments that are described below and combinations of at least two of the modified examples that do not contradict each other. In the modified examples described hereafter, same reference numerals are given to those components that are the same as the corresponding components of the above embodiments. Such components will not be described in detail.

As shown in FIG. 10, the communication device 38 can be configured to receive the third information through wired communication. In a case where the external device 60 includes the memory device 62, the communication device 38 can include a port into which the memory device 62 is inserted.

DESCRIPTION OF REFERENCE CHARACTERS 10) human-powered vehicle, 12) crank, 30, 82) human-powered vehicle control device, 32, 88) artificial intelligence processor, 32A) storage, 34) electric component, 36) operation device, 38) communication device, 42) display device, 44) operation device, 46) electric transmission, 48) drive unit, 50) electric adjustable seatpost, 52) electric suspension, 60) external device, 62) memory device, 64) mobile communication device, 66) personal computer, 68) server, 70) lock device, 72) key, 80) human-powered vehicle control system, 84) electronic device, 86) receiver, 90) transmitter

The invention claimed is:

1. A human-powered vehicle control device comprising:
an artificial intelligence processor including memory in which a learning model is stored;
an operation device for operating an electric component of a human-powered vehicle; and
a communication device configured to communicate wirelessly with an external computing device, wherein
the artificial intelligence processor is configured to generate second information for controlling the electric component in accordance with first information related to at least one of the human-powered vehicle, a rider of the human-powered vehicle, and an environment of the human-powered vehicle,
the artificial intelligence processor is configured to update the learning model via a learning algorithm using a neural network to change a process for generating the second information in accordance with the first information and an operation of the operation device, and
the communication device is configured to transmit third information related to a process for generating the second information to the external computing device.

2. The human-powered vehicle control device according to claim 1, further comprising storage for storing the third information.

3. The human-powered vehicle control device according to claim 1, wherein the external computing device includes at least one of a memory device, a mobile communication device, a personal computer, and a server connected to the Internet.

4. The human-powered vehicle control device according to claim 1, wherein the third information includes predetermined identification information of an individual.

5. The human-powered vehicle control device according to claim 1, wherein the external computing device includes a key of a lock device for restricting at least one of traveling of the human-powered vehicle and operation of the electric component.

6. The human-powered vehicle control device according to claim 1, wherein the electric component includes at least one of a display device, an operation device, an electric transmission, a drive unit that applies propulsion force to the human-powered vehicle, an electric adjustable seatpost, and an electric suspension.

7. The human-powered vehicle control device according to claim 1, wherein the first information related to the human-powered vehicle includes at least one of information related to an electric transmission that changes a transmission ratio of the human-powered vehicle, information related to the transmission ratio changed by the electric transmission, information related to a vehicle speed of the human-powered vehicle, information related to a rotational speed of a crank of the human-powered vehicle, information related to a human driving force input to the human-powered vehicle, and information related to an inclination of the human-powered vehicle.

8. The human-powered vehicle control device according to claim 1, wherein the first information related to the rider of the human-powered vehicle includes biological information of the rider.

9. The human-powered vehicle control device according to claim 1, wherein the first information related to the environment of the human-powered vehicle includes information related to a traveling route of the human-powered vehicle.

10. A human-powered vehicle control device comprising:
an artificial intelligence processor including a memory in which a learning model is stored, the artificial intelligence processor being configured to generate second information for controlling an electric component of a human-powered vehicle in accordance with first information related to at least one of the human-powered vehicle, a rider of the human-powered vehicle, and an environment of the human-powered vehicle; and
a communication device in wireless communication with an external computing device, the communication device being configured to receive third information related to a process for generating the second information transmitted from the external computing device, wherein
the artificial intelligence processor is configured to change the process for generating the second information by updating the learning model via a learning algorithm using a neural network.

11. The human-powered vehicle control device according to claim 10, wherein the artificial intelligence processor is configured to change the second information in accordance with the third information.

12. The human-powered vehicle control device according to claim 11, wherein the artificial intelligence processor is configured to change the process for generating the second information in accordance with the third information.

13. The human-powered vehicle control device according to claim 10, wherein the communication device is configured to receive the third information through wireless communication.

14. A human-powered vehicle control device comprising:
an artificial intelligence processor including memory in which a learning model is stored;
an operation device for operating an electric component of a human-powered vehicle; and
a communication device configured to communicate wirelessly with an external computing device, wherein
the artificial intelligence processor is configured to generate second information for controlling the electric component in accordance with first information related to at least one of the human-powered vehicle, a rider of the human-powered vehicle, and an environment of the human-powered vehicle,
the artificial intelligence processor is configured to change a process for generating the second information by updating the learning model via a learning algorithm using a neural network, and
the communication device is configured to transmit the first information and information related to an operation of the operation device to the external computing device and receive third information related to the process for generating the second information from the external computing device.

15. A human-powered vehicle control system comprising:
the human-powered vehicle control device according to claim 14, wherein the artificial intelligence processor is a first artificial intelligence processor; and
an electronic device comprising:
  a receiver configured to receive the first information and information related to an operation of the operation device transmitted from the communication device of the human-powered vehicle control device,
  a second artificial intelligence processor including a second learning model, the second artificial intelligence processor being configured to generate third information related to a process for generating the second information in accordance with the first information and the operation of the operation device, and
  a transmitter configured to transmit the third information generated by the second artificial intelligence processor to the communication device of the human-powered vehicle control device.

16. An electronic device comprising:
a receiver configured to receive first information and information related to an operation of an operation device transmitted from a communication device of a human-powered vehicle control device that includes a first artificial intelligence processor, wherein
  the first artificial intelligence processor includes a first learning model, the first artificial intelligence processor being configured to generate second information for controlling an electric component of a human-powered vehicle in accordance with the first information related to at least one of the human-powered vehicle, a rider of the human-powered vehicle, and an environment of the human-powered vehicle,
  the operation device is configured to operate the electric component,
  the communication device is configured to communicate wirelessly with the electronic device to transmit the first information and the information related to the operation of the operation device to the electronic device, and
  the first artificial intelligence processor is configured to change a process for generating the second information by updating the first learning model via a learning algorithm using a neural network;
a second artificial intelligence processor including a second learning program, the second artificial intelligence processor being configured to generate third information related to the process for generating the second information in accordance with the first information and the operation of the operation device; and
a transmitter configured to transmit the third information generated by the second artificial intelligence processor to the communication device of the human-powered vehicle control device.

\* \* \* \* \*